United States Patent [19]

Horton

[11] 4,302,494

[45] Nov. 24, 1981

[54] PILE WEATHERSTRIPPING

[76] Inventor: Robert C. Horton, 90 Fairhill Dr., Rochester, N.Y. 14618

[21] Appl. No.: 354,893

[22] Filed: Apr. 26, 1973

[51] Int. Cl.[3] .......... B32B 5/18

[52] U.S. Cl. .......... 428/95; 156/72; 156/73.2; 156/435; 83/924

[58] Field of Search .......... 156/65, 72, 73.1, 73.2, 156/73.4, 161, 166, 169, 173, 174, 176, 177-179, 193, 250, 272, 426, 428, 430-433, 435, 436, 439, 440, 510, 560, 561; 83/924; 49/475; 296/93; 28/1 HF, 1 CS, 1 CL, 2, 72 P, 72 CS, 72 NW; 428/37, 62, 82, 83, 85, 88, 93, 94, 95, 224, 296, 358; 15/117; 49/49; 132/5

[56] References Cited

U.S. PATENT DOCUMENTS

| | | | |
|---|---|---|---|
| 1,195,949 | 8/1916 | Carney | 156/435 |
| 2,475,019 | 7/1949 | Faris | 156/435 |
| 3,082,141 | 3/1963 | Steele et al. | 156/193 |
| 3,303,075 | 2/1967 | Rabus | 156/65 |
| 3,311,960 | 4/1967 | Kessler | 28/72 P |
| 3,312,250 | 4/1967 | Sirignano | 156/73.2 |
| 3,404,487 | 10/1968 | Johnson | 49/475 |
| 3,444,020 | 5/1969 | Kalwaites | 156/169 |
| 3,554,851 | 1/1971 | Modigliani | 156/174 |
| 3,677,851 | 7/1972 | Kayser | 156/169 |
| 3,689,117 | 9/1972 | Hules | 156/72 |
| 3,745,053 | 7/1973 | Johnson et al. | 49/475 |
| 3,836,421 | 9/1974 | Terry et al. | 49/475 |

FOREIGN PATENT DOCUMENTS

| | | | |
|---|---|---|---|
| 1136088 | 4/1960 | Fed. Rep. of Germany | 156/72 |
| 789628 | 11/1935 | France | 156/72 |
| 1192212 | 10/1959 | France | 156/72 |

*Primary Examiner*—John E. Kittle

*Attorney, Agent, or Firm*—Martin LuKacher

[57] ABSTRACT

Yarn of thermoplastic material is wound on a traveling endless band. Backing strips of thermoplastic material are continuously fed along the edges of the band and are ultrasonically welded to the yarn. Thereafter the yarn is slit along opposite sides of the band to provide a pair of continuous pile weatherstrips. The weatherstrips resulting are thus continuously made at high speed and at low cost.

14 Claims, 21 Drawing Figures

PILE WEATHERSTRIPPING

The present invention relates to pile weatherstripping and to methods and apparatus for making same.

The invention is especially suitable for use in making pile weatherstripping of the type conventionally used in the fabrication of aluminum windows and doors. Aspects of the invention, however, will be applicable to pile weatherstripping for other purposes.

Conventionally, pile weatherstripping has been made by forming pile, either by weaving into a backing, or flocking on the backing. The steps of weaving and flocking are time consuming expensive, and make the weatherstrip subject to quality related defects.

It has been suggested to use ultrasonic heating for fusing or welding batches of threads and strips of thermoplastic material to make false eyelashes (see OSHER U.S. Patent No. 3,447,540). However, no satisfactory means have been provided or even suggested whereby pile weatherstripping can be made economically on a continuous basis through the use of fusing or welding methods, either ultrasonically or otherwise.

Accordingly, it is an object of the present invention to provide improved pile weather stripping which can be made by continuous process and more economically and to higher quality than heretofore feasible.

It is a further object of the present invention to provide an improved method of making pile weatherstripping without the need for flocking, weaving, or the use of adhesives, as is the case in conventional processes for the purpose.

It is a still further object of the present invention to provide improved apparatus for making pile weatherstripping, which apparatus is automated to provide improved weatherstripping on a continuous basis.

Briefly described, the improved pile weatherstripping which is provided in accordance with the invention includes a backing strip of thermoplastic material. To this backing strip there is welded thermoplastic yarn and while that yarn is wound around a traveling endless band; a pair of the backing strips being brought into juxtaposition with the opposite edges of the band so that the yarn and the strips can be welded together, say ultrasonically. Thereafter the yarn is slit along the opposite sides of the band to provide a pair of pile weatherstrips.

Improvements provided in accordance with the invention include channels in the strips which confine and conform the yarn so that its piles are readily maintained upright in the form of a brush. Tape of thermoplastic material may be wound around the band prior to the winding of the yarn so as to form a central longitudinal barrier in the pile weatherstrips. In order to facilitate slitting of the piles the invention provides improved methods and means of lifting the yarn into cutting engagement with severing means which cleanly sever the yarn to form the piles.

Other objects, advantages, and features of the invention will become more readily apparent from a reading of the following description in connection with the accompanying drawings in which.

Figure 1:
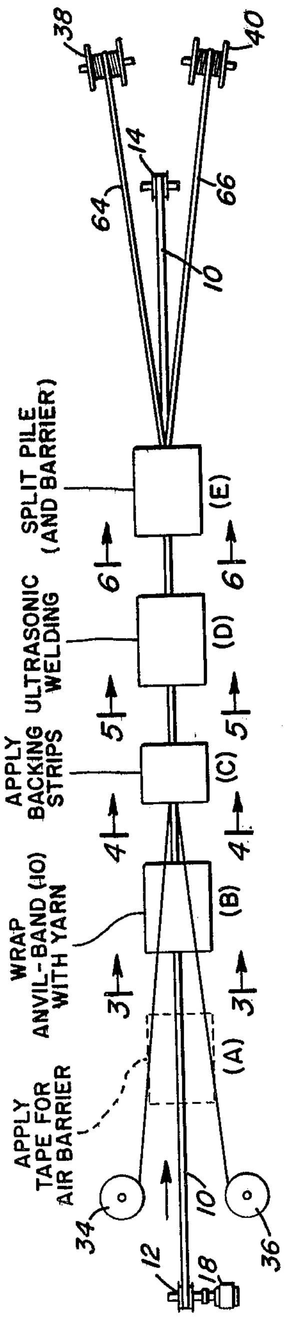
FIG. 1 is a plan view schematically illustrating apparatus for making pile weatherstripping in accordance with the invention.
Figure 2:
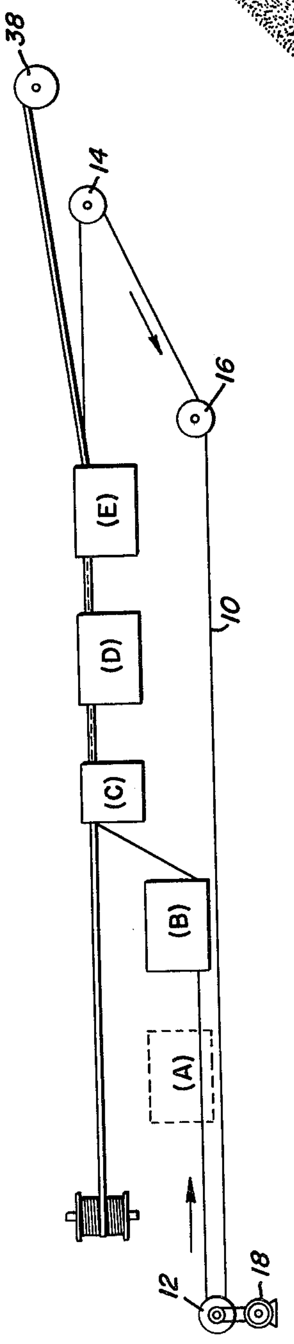
FIG. 2 is a front view of the apparatus shown in FIG. 1.
Figure 7A:
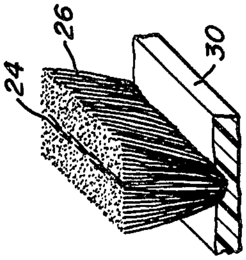
Figure 6:
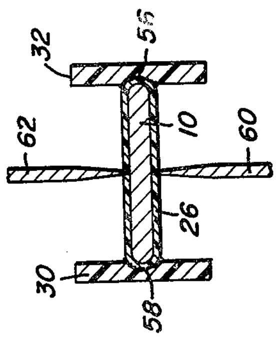
FIG. 6 is a sectional view showing the slitting of the yarn to form the pile.
Figures 8, 9, 10, 11, 12, 12A:
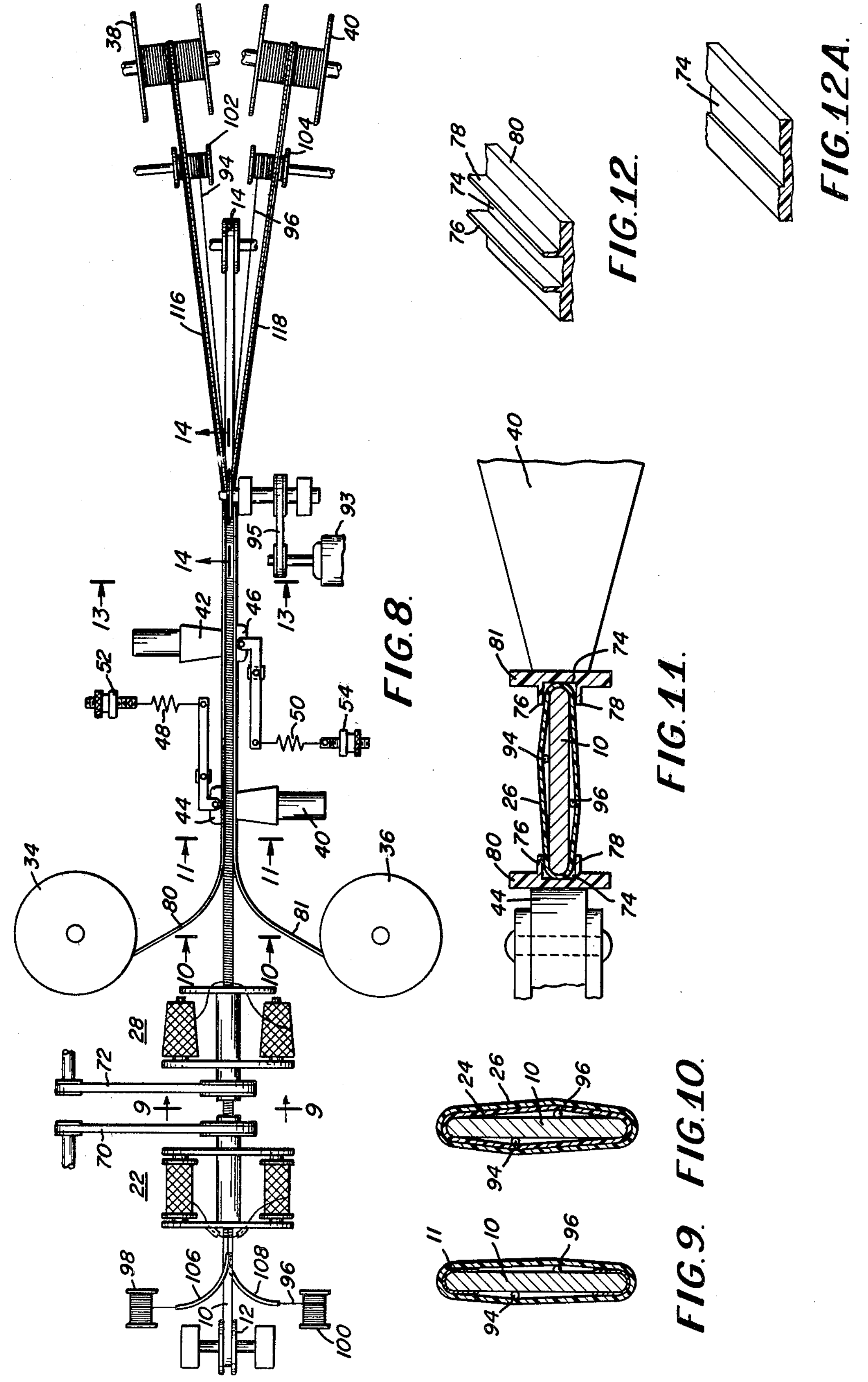
FIG. 8 is a more detailed schematic view of apparatus for making pile weatherstrip in accordance with the invention.
FIG. 9 is a sectional view illustrating the traveling band with tape of thermoplastic film material wound thereon together with filaments which aid in the step of slitting the yarn and tape to form the pile of the weatherstripping.
FIG. 10 is a sectional view similar to FIG. 9 but after the yarn is wound.
FIG. 11 is a sectional view illustrating the yarn and backing strips and other elements in position for ultrasonic welding.
FIG. 12 is a fragmentary perspective view illustrating one of the backing strips shown in FIG. 11.
FIG. 12A is a fragmentary perspective view illustrating another form of backing strip which may be used in accordance with the invention.

Referring more particularly to FIGS. 1 and 2, there is shown a traveling endless band or anvil 10 which is a flat band of metal such as stainless steel constrained by pulleys 12, 14 and 16, to travel along an endless path. One or more of the pulleys is driven by an electric motor 18. The band 10 is shown enlarged in FIG. 4 and in cross-section in FIG. 3. Five stations (A), (B), (C), (D) and (E) are disposed in spaced relationship in the direction of travel of the band 10. In the first of these stations, which may be omitted if desired, a tape of thermoplastic film is wound around the band 10. This tape and all of the other materials which are used in the hereindescribed embodiments of the invention, are thermoplastic. The thermoplastic material known as polypropylene being especially suitable. The tape which is wound around the band 10 in the first station A, is a film of thermoplastic material which is wound helically in overlapping relation on the band 10 and forms an air barrier, or fin, longitudinally along the center of the pile as shown at 24 in FIG. 7A. The tape may be applied by a revolving spindle 22 as shown in FIG. 8. The tape 24 is shown wound around the band 10 in FIG. 3(A). FIG. 4 illustrates the band 10 with the tape 24 and yarn 26 wound thereon.

Figure 3:
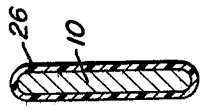
FIGS. 3 and 3A are sectional views showing yarn or yarn and tape applied to a traveling endless band.
Figure 3A:
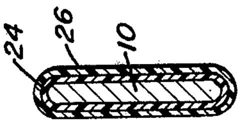
Figure 4:
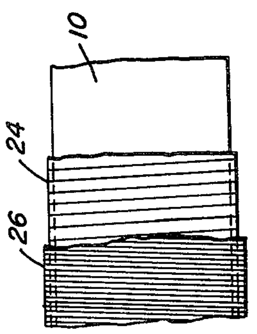
FIG. 4 is a fragmentary front view of the yarn and tape applied to the band, shown in section in FIG. 3A.

In the next station (B) the yarn 26 is wound around the band 10, as shown in FIG. 3, over the tape 24 if the station (A) is used, as shown in FIG. 3(A). A spindle 28 as shown in FIG. 8 may be used for the purpose of winding the yarn. The yarn itself is thermoplastic material, such as polypropylene and is wound in a multiplicity of layers so as to form a thick pile.

In the next station (C) the backing strips 30 and 32 are fed or guided against the edges of the yarn-covered band 10. The strips 30 and 32 are also of thermoplastic material preferably the same material as the yarn (which in this example is polypropylene). These strips are guided into juxtaposition with the band edges, as from reels 34 and 36 (FIG. 8). Ultimately, the backing strips 30 and 32 form part of the weatherstrips themselves and are taken up after passage along the path of the belt 10 by take-up reels 38 and 40 which may be driven by motors (not shown). Suitable guides, such as rollers (not shown) are used to apply the backing strips and hold them in position with their sides against the yarn-covered edges of the band 10.

At the next station (D) ultrasonic welding is accomplished so as to melt the strips and the yarn where they are disposed in juxtaposition and cause them to fuse together. Welding is done on a continuous basis, preferably at a pair of welding stations, as shown in FIG. 8. The horns 40 and 42 of ultrasonic tools are disposed on the rear side of the strips, (first the strip 32, then the strip 30). On the opposite side of the tools there are disposed pressure shoes 44 and 46 pivotally mounted on lever arms. Springs 48 and 50, the bias force of which is adjusted by means of screw mechanisms 52 and 54 bias the lever arms and yieldably urge the shoes 44 and 46 against the rear of the strips 30 and 32. The ultrasonic energy melts and welds the backing strip and the yarn by allowing them to fuse to each other. The heating action due to the ultrasonic energy also assists the yarn in forming a permanent set to the shape of the band 10 so that it tends to stand upright when it is later severed and released from the band to form the pile (see FIG. 7). It is preferred however, that the backing strips have channels formed therein such as shown in FIGS. 12 and 12A, which confine the bent yarn and assure that the yarn is maintained in upright position in the backing strip (see FIG. 16). Further, it is preferred to coat or cover the edges of the band 10 with an insulating material 11 (see FIG. 9) to prevent dissipation of heat through the band. A tape of material sold by the E. I. Dupont Company of Wilmington, under the trade name Kapton being especially suitable.

Figure 5:
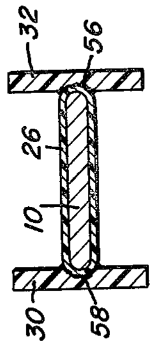
FIG. 5 is a sectional view showing the backing strips and yarn welded to each other.

FIG. 5 shows the yarn 26 upon the band 10 with ultrasonic welds at 56 and 58.

Figure 7:
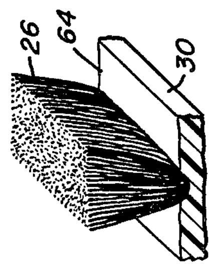
FIG. 7 and FIG. 7A, are fragmentary perspective views illustrating the pile weatherstrip respectively without and with a central longitudinal barrier formed by the tape when tape is applied as shown in FIGS. 3 and in 3A and 4.

In station (E) the pile is slit by cutter blades 60 and 62. These blades are disposed along the sides of the band 10. When slit, two pile weatherstrips 64 and 66 are formed which are wound on the take-up reels 38 and 40. One of these strips 64 is illustrated in FIG. 7. In the event that the barrier tape 24 is utilized (as shown in FIGS. 3A and 4) the central longitudinal barrier or fin illustrated in FIG. 7 is provided in the weatherstrips. It will be appreciated, of course, that the tape 24 will be welded together with the yarn and the backing strips in the ultrasonic welding step at station (D).

The foregoing apparatus and method is operative continuously and in an automated manner to provide pile weatherstrips. As will be apparent, the pile is formed in the course of and as part of the method in operation of the machine. The pile weatherstrip formed thus is a new and useful product which may be manufactured at lower cost than woven or flocked weatherstrips of the type which have been conventionally produced heretofore.

Figure 16:
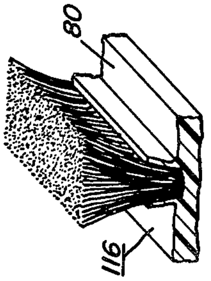
FIG. 16 is a fragmentary view of pile weatherstripping which is made by the apparatus shown in FIG. 8.
Figure 12B:
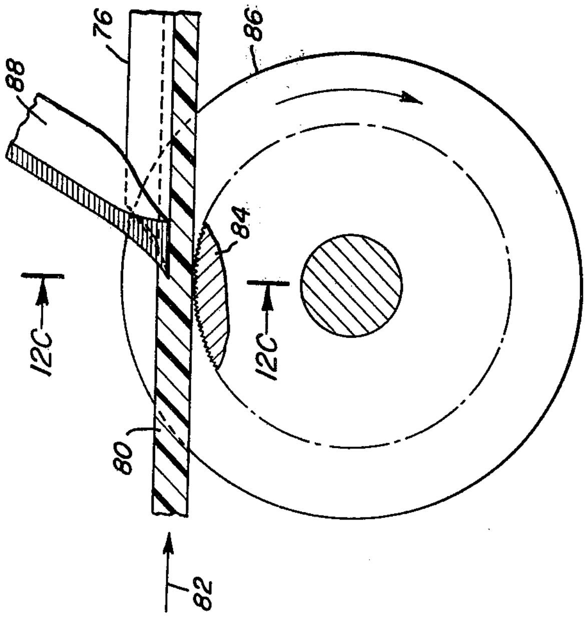
FIGS. 12B and 12C are sectional views illustrating apparatus for providing the flanged weatherstrip of the type shown in FIG. 12.

The apparatus shown in FIG. 8 provides the improved weatherstrips illustrated in FIG. 16. As in the apparatus shown in FIGS. 1 and 2 an endless ban 10 is continuously driven past stations where air barrier tape 24 may be first wound on the band 10 if desired. The spindle mechanism 22 which winds the air barrier tape 24 on the band 10 may be driven by a belt and pulley mechanism 70. Another belt and pulley mechanism 72 may be used to drive the spindle mechanism 28 which winds the yarn 26 on the band 10 (over the tape 24) if the tape is used. The barrier tape is shown wound around the band 10 in FIG. 9. Illustrated in FIG. 9 but not elsewhere, to simplify the drawing, is the insulating tape 11 which covers the edges of the band and reduces the effect of the band as a heat sink during welding operations. The reels 34 and 36 which apply the backing strips 80 and 81 were described above. In this embodiment, backing strips of the type shown in FIG. 12 or 12A are used. These strips are characterized by having channels 74 which extend longitudinally through the center of the backing strips. The channels may be formed by extrusion or by means of a milling tool. However, the method of making the backing strips to provide the channel 74 with parallel flanges 76 and 78 is preferred. This method is illustrated in FIGS. 12B and C. The raw strip 80 which is rectangular in cross section initially, is driven in the direction indicated by the arrow 82 in FIG. 12B by means of a serrated drive roller 84. Flanges 86 on the roller 84 provides edge guidance of the strip 80. A plow 88 enters into the strip 80 and plows apart the two flanges 74 and 76 (the flange 76 being shown in FIG. 12B). By this method no material is wasted and need be disposed of with adverse environmental effects.

The band 10 with the yarn 26 wound thereon is received into the channel 74 formed between the flanges 76 and 78 of the backing strips 80 and 81. The flanges 76 and 78 thus confine the yarn, and insure that the yarn will be in upright position when cut to form the pile. FIG. 11 illustrates the relative disposition of the opposite edges of the yarn-wound band 10 in the channels 74 during ultrasonic welding. The welding horn 40 is pressed against the rear of the backing strip 81 by means of pressure applied by the pressure shoe 44. When the horn 40 is ultrasonically vibrated the yarn and the front of the strip 81 melt and fuse together. Sufficient ultrasonic energy is applied to set the yarn and fuse the yarn to the backing strip. Inasmuch as the flanges 76 and 78 assist in defining the pile, the amount of energy required is reduced; thus increasing the speed of the welding process and therefore the production rate of the entire machine.

Figure 13:
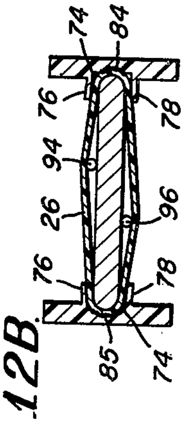
FIG. 13 is a sectional view illustrating the weatherstrip after ultrasonic welding.
Figure 12C:
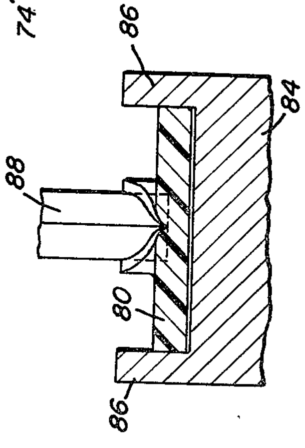

FIG. 13 illustrates that the yarn and backing strips are fused to each other at 84 and 85, the flanges 76 and 78, since they confine the pile and maintain it in upright position, thus minimize the amount of ultrasonic energy needed to set and fuse the yarn to the backing strip and set the pile in upright position.

Figure 14:
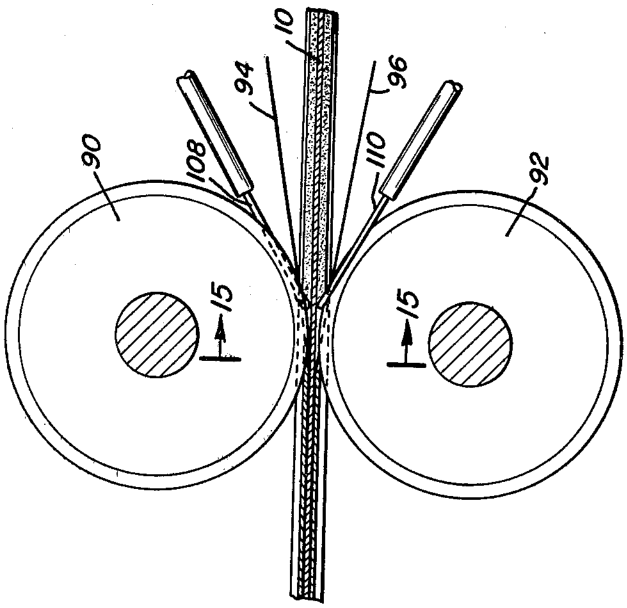
FIG. 14 is a sectional view illustrating the slitting station in the apparatus shown in FIG. 8.

The apparatus shown in FIG. 8 is further improved in the method and means for slitting the yarn to form the pile. The slitting is accomplished at a slitting station at which two rotating cutting wheels 90 and 92 (see also FIG. 14) are disposed. These wheels may be driven by a motor 93 through a belt and pulley mechanism 95. As will be observed in FIGS. 14 and 15 the edges of the cutting wheels 90 and 92 do not touch the band 10 and are thus not dulled by the band. The yarn is lifted and held in tension in cutting engagement with the cutting edges of the wheels 90 and 92, by means of filaments 94 and 96. These filaments are fed along the opposite sides of the band 10 in laterally offset relation between supply spools 98 and 100 and take-up spools 102 and 104, the latter being adapted to be motor driven by motor drive means (not shown). Alternatively, filaments 94 and 96 may be disposed one directly above the other. Guides 106 and 108 (FIG. 8) guide the filaments 94 and 96 along the band 10 immediately ahead of the barrier tape winding spindle 22.

Figure 15:
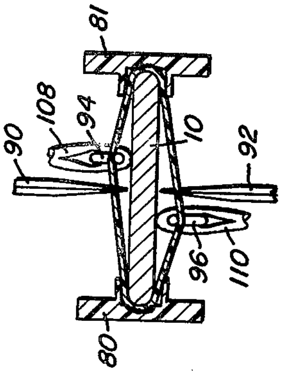
FIG. 15 is a fragmentary sectional view of the slitting station illustrated in FIG. 14.

At the slitting station a pair of needles 108 and 110 which are disposed in canted relationship with respect to the sides of the band 10 have the filaments 94 and 96 threaded therethrough (see FIG. 15). The needles may be laterally offset as shown or disposed one directly above the other (i.e., in the same plane). As the filaments pass through the eyes of the needles they are lifted up and away from the band 10. Thus, the filaments hold the yarn 26 in tension against the cutting edges of the wheels 90 and 92. Each and every fiber of the yarn is therefore brought into engagement with the wheel and cleanly slit. After slitting there are provided a pair of weather strips 116 and 118 (FIG. 8) which are wound on the take-up wheels 38 and 40. The weatherstrip 116 is shown by way of example in FIG. 16. In the event that the air barrier tape had initially been wound on the band 10, a central fin structure extending longitudinally of the pile would be provided in the weatherstrip as was shown in FIG. 7A.

While the use of the filaments 94 and 96 and needles 108, 110 is preferred, lifting of the yarn may be provided by longitudinal ridges on the band, raised say by means of a chisel or applied as by welding. The needles would then lift the yarn when inserted in the space between the sides of the ridges and the band 10.

From the foregoing description it will be apparent that there has been provided an improved method and means for making pile weatherstrips on a continuous automated basis. The pile weatherstrip itself is an improved product which is formed without the need for weaving or flocking as in pile weatherstrip making processes heretofore available. Variations and modifications in the hereindescribed weatherstrip and the methods and means for making the same, will of course suggest themselves to those skilled in the art. Accordingly, the foregoing description should be taken merely as illustrative and not in any limiting sense.

What is claimed is:

1. Apparatus for making pile weather stripping which comprises:
   (a) a band, which travels along an endless path,
   (b) means for continuously winding thermoplastic yarn around said band as it travels past a first region in said path,
   (c) means for continuously feeding strips of thermoplastic material along opposite sides of said path in a second region of said path spaced from said first region in the direction of travel of said band, with the sides of said strips in juxtaposition with said yarn along opposite edges of said band,
   (d) means disposed along said path in said direction of travel past said second region for continuously welding said yarn to said strips at the edges of said band,
   (e) means disposed at a third region along said path spaced away from said welding means in the direction of travel of said band for continuously slitting said yarn along opposite sides of said band to form a pair of continuous pile weatherstrips, and
   (f) means for continuously winding a tape of thermoplastic film material helically in overlapping relationship around said band at a fourth region along said path located behind said first region in the direction of travel of said band and before said yarn is wound thereon whereby to provide a longitudinal barrier of said film along the center of said pile weatherstrip.

2. Apparatus for making pile weather stripping which comprises:
   (a) a band, which travels along an endless path,
   (b) means for continuously winding thermoplastic yarn around said band as it travels past a first region in said path,
   (c) means for continuously feeding strips of thermoplastic material along opposite sides of said path in a second region of said path spaced from said first region in the direction of travel of said band, with the sides of said strips in juxtaposition with said yarn along opposite edges of said band,
   (d) means disposed along said path in said direction of travel past said second region for continuously welding said yarn to said strips at the edges of said band,
   (e) means disposed at a third region along said path spaced away from said welding means in the direction of travel of said band for continuously slitting said yarn along opposite sides of said band to form a pair of continuous pile weatherstrips, and
   (f) means for providing channels extending longitudinally along said strips, said feeding means being operative to feed said strips with their said channels into the opposite edges of said band so that said opposite edges and the yarn thereon are received in said channels.

3. Apparatus for making pile weather stripping which comprises:
   (a) a band, which travels along an endless path,
   (b) means for continuously winding thermoplastic yarn around said band as it travels past a first region in said path,
   (c) means for continuously feeding strips of thermoplastic material along opposite sides of said path in a second region of said path spaced from said first region in the direction of travel of said band, with the sides of said strips in juxtaposition with said yarn along opposite edges of said band,
   (d) means disposed along said path in said direction of travel past said second region for continuously welding said yarn to said strips at the edges of said band,
   (e) means disposed at a third region along said path spaced away from said welding means in the direction of travel of said band for continuously slitting said yarn along opposite sides of said band to form a pair of continuous pile weatherstrips, and
   (f) the edges of said band have a covering of heat insulating material thereon and attached thereto for inhibiting the dissipation of heat generated by said welding means through said band.

4. Apparatus for making pile weather stripping which comprises:
   (a) a band, which travels along an endless path, (b) means for continuously winding thermoplastic yarn around said band as it travels past a first region in said path, (c) means for continuously feeding strips of thermoplastic material along opposite sides of said path in a second region of said path spaced from said first region in the direction of travel of said band, with the sides of said strips in juxtaposition with said yarn along opposite edges of said band, (d) means disposed along said path in said direction of travel past said second region for continuously welding said yarn to said strips at the edges of said band, (e) means disposed at a third region along said path spaced away from said welding means in the direction of travel of said band for continuously slitting said yarn along opposite sides of said band to form a pair of continuous pile weatherstrips, and (f) said slitting means comprising means having cutting edges spaced from the surfaces of the sides of said band, and out of contact therewith, means disposed along the sides of said band and under said yarn for lifting said yarn into engagement with said cutting edges whereby to slit said yarn without contacting said band.

5. Apparatus for making pile weather stripping which comprises:

(a) a band, which travels along an endless path, (b) means for continuously winding thermoplastic yarn around said band as it travels past a first region is said path, (c) means for continuously feeding strips of thermoplastic material along opposite sides of said path in a second region of said path spaced from said first region in the direction of travel of said band, with the sides of said strips in juxtaposition with said yarn along opposite edges of said band, (d) means disposed along said path in said direction of travel past said second region for continuously welding said yarn to said strips at the edges of said band, (e) means disposed at a third region along said path spaced away from said welding means in the direction of travel of said band for continuously slitting said yarn along opposite sides of said band to form a pair of continuous pile weather strips, and (f) said slitting means comprising means having cutting edges spaced from the surfaces of the sides of said band, and means for feeding filaments along the sides of said band, and whereby a pair of needles are provided through which said filaments are threaded, said needles being disposed through said yarn along opposite sides of said bands and being canted with respect to said opposite sides for lifting said filament to bring said yarn into engagement with said cutting edges.

6. A pile weather stripping comprising a strip of thermoplastic material, and a pile of thermoplastic material yarn formed by winding around an endless travelling band, said yarn and strip being welded together while said pile is on said band, and the edge of said band brings the yarn wound thereon and the side of said strip into proximity with each other for welding and the yarn being slit while said yarn is on said band to form said pile, a tape of thermoplastic film material disposed longitudinally along said weather strip and within said yarn, said tape being wound upon said band and said yarn being wound around said tape, and said tape being slit with said yarn while on said band.

7. The invention as set forth in claim 6 wherein said strip has a channel therein extending longitudinally along one side thereof, said yarn being disposed in said channel and being welded therein.

8. The invention as set forth in claim 7 wherein said channel has a pair of flanges unitary with said strip, said flanges defining the longitudinal sides of said channel.

9. In the method of making pile weatherstripping wherein yarn is continuously wound around an endless travelling band, welded to backing strips fed along opposite edges of said band, and severed along opposite sides of said band to provide a pair of pile weatherstrips, the improvement comprising the step of winding a tape of thermoplastic material around said band adjacent to the yarn thereon to provide a longitudinal barrier along said pile weatherstrips.

10. In the method of making pile weatherstripping wherein yarn is continuously wound around an endless travelling band, welded to backing strips fed along opposite edges of said band and severed along opposite sides of said band to provide a pair of pile weatherstrips, the improvement comprising the steps of forming channels in each of said backing strips, and feeding said backing strips along said band so that said edges and the yarn thereon are received in said channels prior to welding.

11. In the method of making pile weatherstripping wherein yarn is continuously wound around an endless travelling band, welded to backing strips fed along opposite edges of said band and severed along opposite sides of said band to provide a pair of pile weather strips, the improvement comprising the steps of forming channels in each of said backing strips, feeding said backing strips along said band so that said edges and the yarn thereon are received in said channels prior to welding, and said forming step being performed by plowing a furrow into said strips to form a pair of longitudinal flanges which define said channel therebetween.

12. In the method of making pile weatherstripping wherein yarn is continuously wound around an endless travelling band, welded to backing strips fed along opposite edges of said band and severed along opposite sides of said band to provide a pair of pile weatherstrips, the improvement which comprises the steps of feeding filaments along said band under said yarn, and lifting said filaments to bring said yarn into positions to be severed.

13. The invention as set forth in claim 12 wherein said feeding step is carried out by feeding the filaments each along an opposite side of said band, in laterally offset relationship from each other.

14. The invention as set forth in claim 9 wherein said tape is wound around said band prior to the winding of the yarn thereon to provide said barrier along the center of said pile weather strips.

* * * * *